United States Patent [19]

Anderson

[11] Patent Number: 5,549,392
[45] Date of Patent: Aug. 27, 1996

[54] RESILIENT MOUNT PAD JOURNAL BEARING

[75] Inventor: William J. Anderson, North Olmsted, Ohio

[73] Assignee: Nastec, Inc., Cleveland, Ohio

[21] Appl. No.: 433,534

[22] Filed: May 2, 1995

[51] Int. Cl.⁶ ................................................. F16C 17/03
[52] U.S. Cl. ........................ 384/117; 384/104; 384/119
[58] Field of Search ................................. 384/117, 104, 384/119, 106, 312, 309

[56] References Cited

U.S. PATENT DOCUMENTS

| | | | |
|---|---|---|---|
| 3,215,479 | 11/1965 | Silver et al. | 384/104 |
| 3,215,480 | 11/1965 | Marley | 384/104 |
| 3,930,691 | 1/1976 | Greene . | |
| 4,403,873 | 9/1983 | Gardner . | |
| 4,496,251 | 1/1985 | Ide . | |
| 4,515,486 | 5/1985 | Ide . | |
| 4,815,864 | 3/1989 | Jones | 384/104 |
| 5,066,144 | 11/1991 | Ide | 384/117 |

*Primary Examiner*—Lenard A. Footland
*Attorney, Agent, or Firm*—Longacre & White

[57] ABSTRACT

The present disclosure concerns resiliently mounted pad type journal bearings. Compensation for lateral movement of a journal due to shifts in loading is achieved by varying the profile of the hydrodynamic wedge between one or more of the bearing pads and the journal. Journal bearings according to the present invention are appropriate for either monodirectional or bi-directional journal rotation.

8 Claims, 3 Drawing Sheets

5,549,392

RESILIENT MOUNT PAD JOURNAL BEARING

BACKGROUND OF THE INVENTION

1. Field of the Invention

The present invention concerns journal bearings which are resiliently mounted to optimize load capacity for varying operating conditions.

2. Description of Related Art

Bearings may be classified broadly into three main categories: Hydrodynamic sliding bearings, roller bearings, and hydrostatic bearings. Each of the aforementioned types of bearings have problems associated with load-carrying capacity, accuracy, lubricant requirements due to friction, wear and fatigue.

Hydrodynamic sliding bearings typically operate so that the bearing surfaces which slide against each other are rigid and lubricant in the form of a film between the bearing surfaces, which is under hydrodynamic pressure generated by the motion of the bearing itself, serves to support the bearing surfaces in a spaced relation to permit relative movement of the bearing members without wear. These hydrodynamic sliding bearings may be characterized as a rigid isoviscous sliding device wherein a stationary sleeve is used to support a rotatable member such as a shaft in a stationary housing. A lubricant is provided between the interengaging cylindrical surfaces of the sleeve and shaft, whereby upon relative rotation of the bearing surfaces, the hydrodynamic lubricant pressure builds up to support the shaft.

Rolling member bearings characteristically involve bearing surfaces which are capable of rolling on each other, and lubricant being disposed between the bearing surfaces. Rolling member bearings include inner and outer rings which are spaced apart to define an annular space for a plurality of rolling members such as balls or rollers.

In hydrostatic sliding bearings, the rotating shaft is supported or floated on a body of pressurized fluid lubricant, either gaseous or liquid. Such assemblies require complex lubricant feed systems.

The present invention provides an improved hydrodynamic sliding bearing, wherein the stresses or loads on the bearings are more evenly distributed between the bearing pads. Examples of hydrodynamic sliding bearings are described in patents to Greene (U.S. Pat. No. 3,930,691), Ide (U.S. Pat. Nos. 4,496,251 and 4,515,486), as well as Gardner (U.S. Pat. No. 4,403,873).

Greene describes a hydrodynamic sliding bearing which includes a bearing pad having a metal-elastomer laminated structure which is arcuately curved with the center of curvature of the arc being in the direction of the opposing member of the bearing. The structure of the bearing pads permits swinging thereof to produce a wedge converging in the direction of movement of the moving member, such as a shaft. The bearing pad includes face and base sections which are bonded to a metal-elastomer laminant. This pad may be used with either journal or thrust bearings.

Ide '486 describes an elastomeric supported hydrodynamic bearing which consists essentially of a number of bearing pads, each having a face member and a support member that are separated and bonded together by an elastomeric material. The face member having a load engaging surface, and its back surface having at least one arcuate portion to provide a point of inflection which opposes an identical arcuate surface providing another point of inflection located on the support member.

Ide '251 describes a hydrodynamic bearing wherein the bearing surfaces are segmented into a plurality of pads that rockingly displace themselves to form a wedge shape converging in the direction of motion with a relatively moving part. The pads are each supported in a bearing housing or support portion by a plurality of webs which are integral with the pad and the housing or support portion, which allow the pads to rock by deflection of the webs.

Gardner describes a hydrodynamic thrust bearing with tilting pads. The thrust bearing pads are provided with a radically extending rib on a side that is remote from the surface of the pad that interfaces with the shaft collar. Each pad is supported on a disk that has a planar surface on which the rib of a pad bearing and each disk has a spherical surface opposite from its planar surface. The disks are supported on leveling links that have angular, but flat, wings extending in opposite circumferential directions. The links have a radial hole and are supported for pivoting on a fixed pin about an axis.

Essentially, each of the aforementioned hydrodynamic bearings is mounted in such a way that it can move to permit the formation of a wedge-shaped film of lubricant between the relatively moving parts. The pads are displaced through a swing-type motion about a center located in front of each pad's surface, and bearing friction tends to open the wedge.

Each of these journal and thrust-type hydrodynamic bearings has a common problem with load distribution among the pads. The shore or bearing pad situated directly below the load has the greatest stress or highest load. Each additional bearing pad adjacent to the load carrying pad carries less and less of a load, such that the pads situated 90 degrees from the load carrying pad carry no load. This uneven load distribution among the pads results in some bearing pads having higher loads, greater stresses, and/or increased wear and fatigue.

SUMMARY OF THE INVENTION

An objective of the present invention is to provide a journal bearing having resiliently mounted pads which assume an optimal position in response to journal motion at start-up. In particular, the present invention provides a journal bearing having resiliently mounted pads which are capable of attaining an optimal load capacity positions in a fraction of a revolution of the journal. Another object of the present invention is to provide journal bearings having the aforementioned performance characteristics which are either unidirectional or bidirectional.

DESCRIPTION OF THE PREFERRED EMBODIMENT

Figure 1:
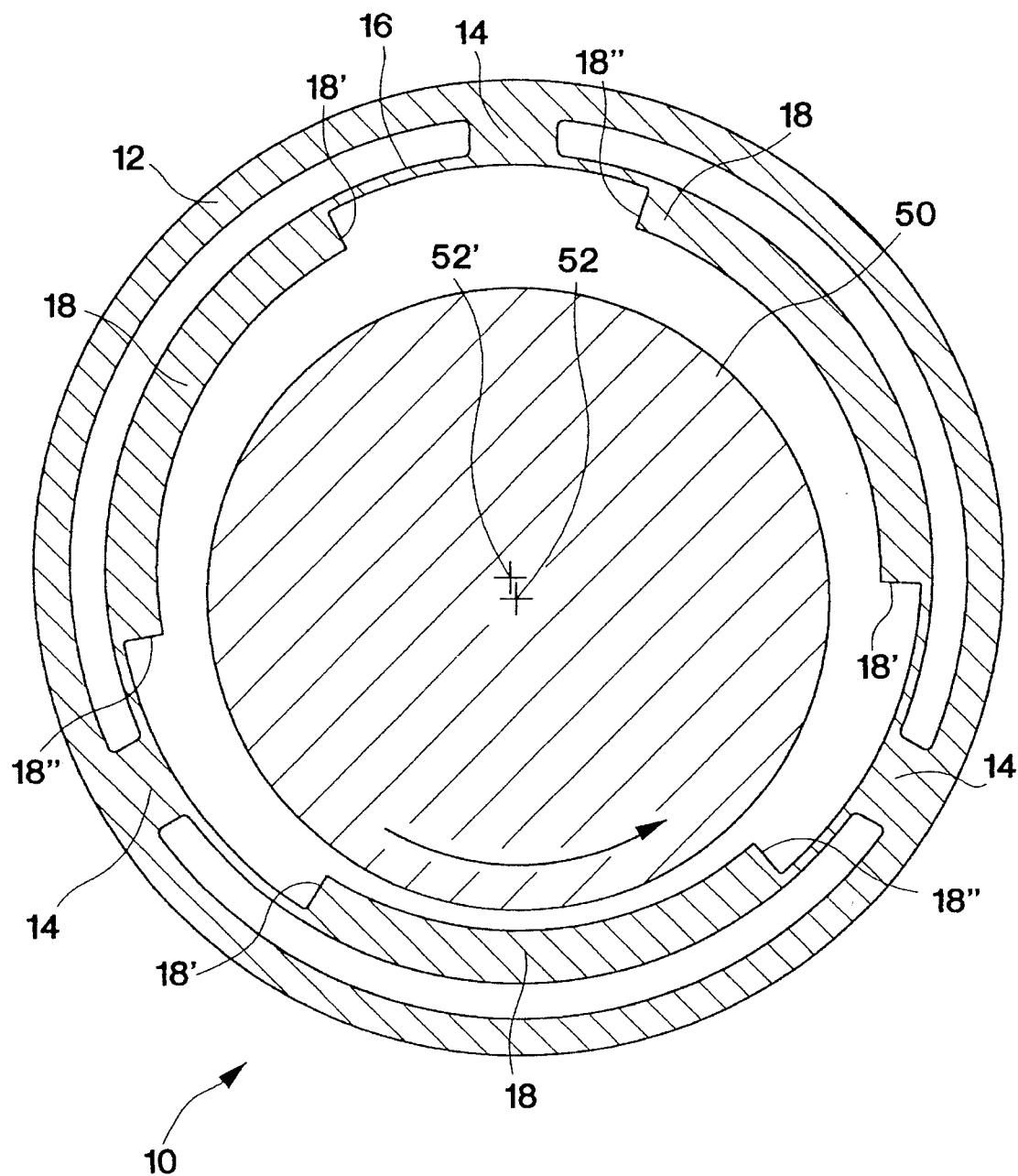
FIG. 1 shows a unidirectional embodiment according to the present invention.

A unidirectional journal bearing 10 according to the present invention is illustrated in FIG. 1. The journal bearing 10 supports a counter-clockwise rotating journal 50 which has an axis of rotation 52. Due to variations in loading, as well as the improbability of achieving a perfectly balanced rotating mass, the position of the axis 52 shifts laterally as indicated at 52' (exaggerated for the purposes of illustration). An object of the journal bearing 10 is to provide uniform support for the journal 50 as its axis 52 is shifted 52'.

The journal bearing 10 comprises a bearing shell 12 circumscribing the journal 50. The bearing shell 12 is held stationary within a housing or support (not shown). A plurality of projections 14 (three are illustrated) are fixed with respect to the bearing shell 12 and extend radially inward toward the journal 50. The projections 14 are equally spaced around the circumference of the bearing shell 12.

A resilient mounting 16 also circumscribes the journal 50 and is radially interposed between the bearing shell 12 and the journal 50. According to the unidirectional journal bearing 10 of the present invention, support for the resilient mounting 16 with respect to the radially inner end of the projections 14 is by rigid connection. Inasmuch as the resilient mounting 19 has a relatively small radial thickness, deflection in the radial direction is limited only by the plurality of projections 14.

A plurality of bearing pads 18 (three are illustrated) are fixed with respect to the resilient mounting 16 and extend radially inward toward the journal 50. The bearing pads 18 are equally spaced around the circumference of the resilient mounting 16.

As shown, there are an equal number of projections 14 and bearing pads 18. Each projection 14 and bearing pad 18 is circumferentially interposed between consecutive ones of the other element in an alternating fashion. That is to say, each projection 14 is circumferentially interposed between consecutive ones of the bearing pads 18, and each bearing pad 18 is circumferentially interposed between consecutive ones of the projections 14.

The unidirectional journal bearing 10 is capable of positioning the bearing pads 18 for optimal load capacity by virtue of the asymmetric relationship of each projection 14 and bearing pad 18 with respect to circumferentially consecutive ones of the other element. Specifically, the circumferential distance from the leading edge 18' (with respect to the direction of rotation of the journal 50) of each bearing pad 18 to the projection 14 proximate to the leading edge 18' is greater than the circumferential distance from the trailing edge 18" (again, with respect to the direction of rotation of the journal 50) of the same bearing pad 18 to the projection 14 proximate to the trailing edge 18".

In operation, rotation of the journal 50 (counter-clockwise is illustrated) within the unidirectional journal bearing 10 is accompanied by lateral shifting of the axis 52. The leading edge 18' of a bearing pad 18 (against which the lateral shifting is directed) radially deflects (by virtue of its attachment to the resilient mounting 16) a greater amount than the trailing edge 18". This changes the profile of the hydrodynamic pressure wedge between the bearing pad 18 and the journal 50, which facilitates an increased load carrying ability by the bearing pad 18.

Figure 2:
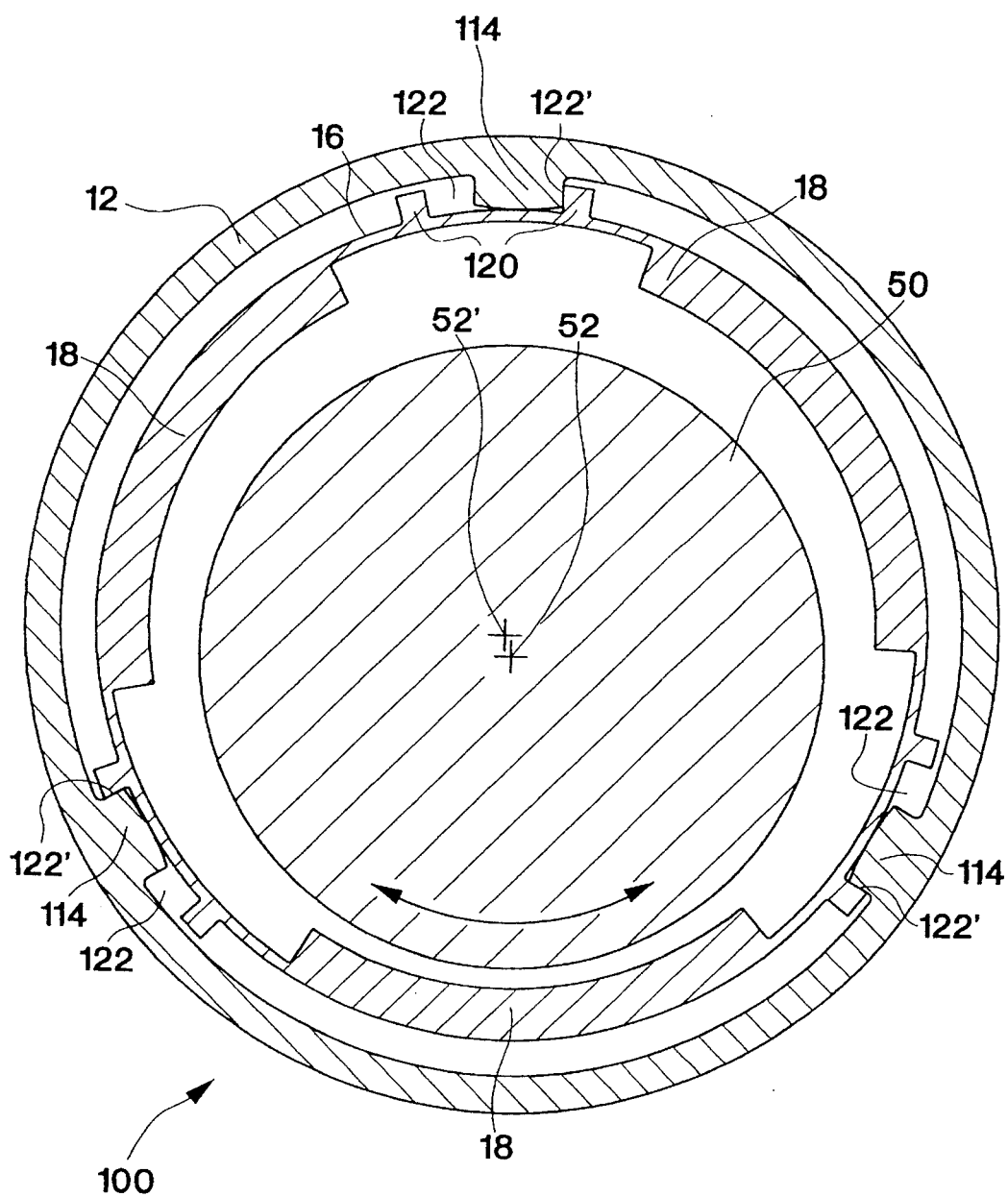
FIG. 2 shows a first bidirectional embodiment according to the present invention.

A bidirectional journal bearing 100 according to the present invention is illustrated in FIG. 2. The journal bearing 100 supports a bidirectional rotating journal 50 which has an axis of rotation 52. Due to variations in loading, as well as the improbability of achieving a perfectly balanced rotating mass, the position of the axis 52 shifts laterally as indicated at 52' (exaggerated for the purposes of illustration). An object of the journal bearing 100 is to provide uniform support for the journal 50, regardless of its direction of rotation, as its axis 52 is shifted 52'.

The journal bearing 100 comprises a bearing shell 12 circumscribing the journal 50. The bearing shell 12 is held stationary within a housing or support (not shown). A plurality of projections 114 (three are illustrated) are fixed with respect to the bearing shell 12 and extend radially inward toward the journal 50. The projections 114 are equally spaced around the circumference of the bearing shell 12.

A resilient mounting 16 also circumscribes the journal 50 and is radially interposed between the bearing shell 12 and the journal 50. According to the bidirectional journal bearing 100 of the present invention, support for the resilient mounting 16 with respect to the projections 114 is by circumferentially interposing each projection 114 in a respective pair of stops 120 (three pairs are illustrated, one pair for each projection 114). The plurality of stops 120 are fixed with respect to the resilient mounting 16 and extend radially outward toward the bearing shell 12. Gaps 122,122' are located on the circumferential sides of each projection 114.

A plurality of bearing pads 18 (three are illustrated) are fixed with respect to the resilient mounting 16 and extend radially inward toward the journal 50. The bearing pads 18 are equally spaced around the circumference of the resilient mounting 16.

As shown, there are an equal number of projections 114 and bearing pads 18. Each projection 114 and bearing pad 18 is circumferentially interposed between consecutive ones of the other element in an alternating fashion. That is to say, each projection 114 is circumferentially interposed between consecutive ones of the bearing pads 18, and each bearing pad 18 is circumferentially interposed between consecutive ones of the projections 114.

Figure 3:
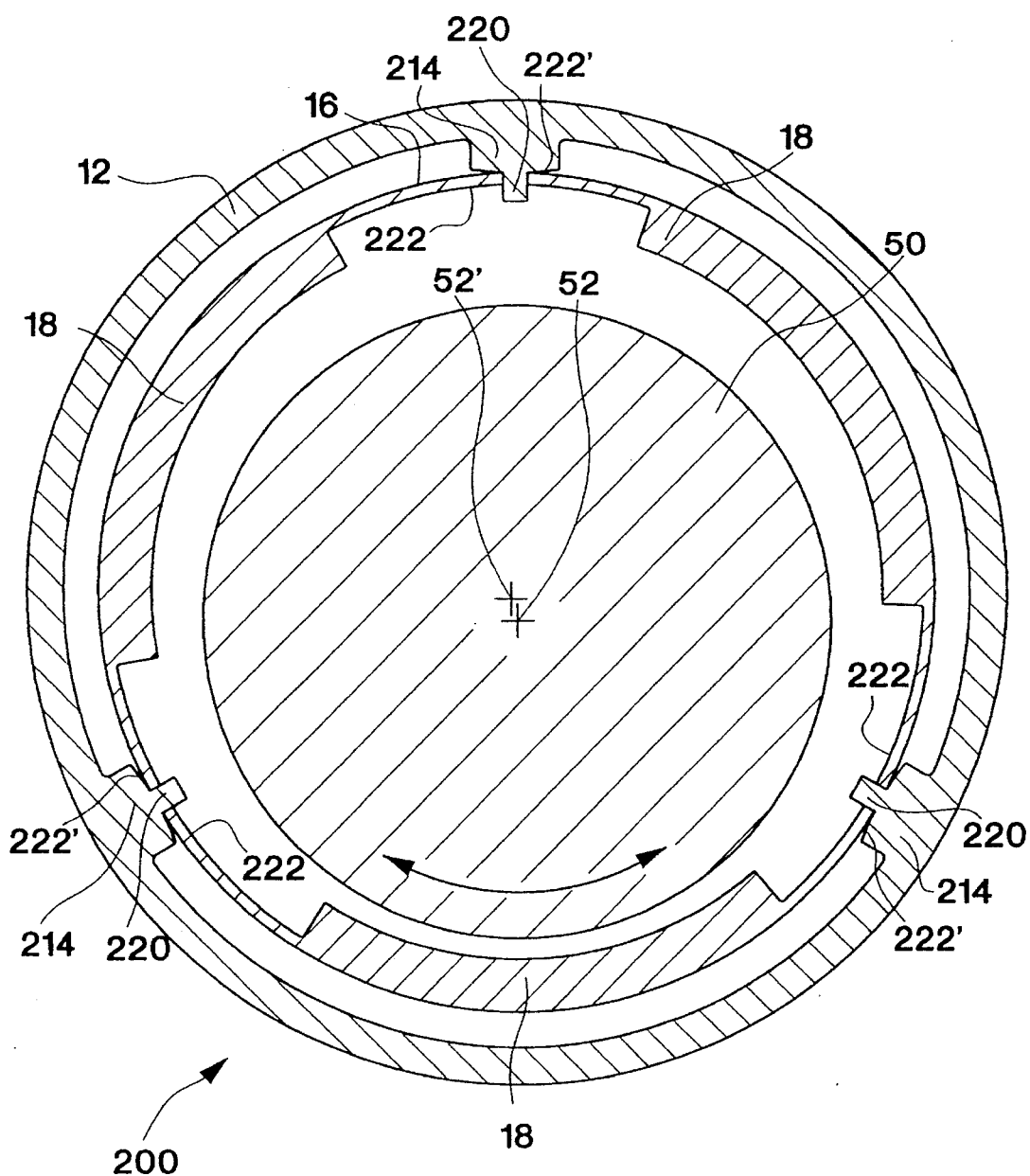
FIG. 3 shows a second bidirectional embodiment according to the present invention.

In operation, rotation of the journal 50 in either direction within the bidirectional journal bearing 100 is accompanied by lateral shifting of the axis 52. Counter-clockwise rotation of the journal 50 causes the bearing pads 18 and resilient mounting 16 to shift counter-clockwise until a first stop of each pair of stops 120 contacts the respective projection 114 (i.e. the gaps 122' are closed; as illustrated in FIG. 3). Clockwise rotation of the journal 50 causes the bearing pads and resilient mounting 16 to shift clockwise until the second stop of each pair of stops 120 contacts the respective projection 114 (i.e. the gaps 122 are closed; not shown). In each case, the circumferential distance from the leading edge (with respect to the direction of rotation of the journal 50) of each bearing pad 18 to the projection 114 proximate to the leading edge is greater than the circumferential distance from the trailing edge (again, with respect to the direction of rotation of the journal 50) of the same bearing pad 18 to the projection 114 proximate to the trailing edge. Inasmuch as the resilient mounting 16 has a relatively small radial thickness, deflection in the radial direction is limited only by the plurality of projections 114. The leading edge of a bearing pad 18 (against which the lateral shifting is directed) radially deflects (by virtue of its attachment to the resilient mounting 16) a greater amount than the trailing edge. This changes the profile of the hydrodynamic pressure wedge between the bearing pad 18 and the journal 50, which facilitates an increased load carrying ability by the bearing pad 18.

The bidirectional journal bearing 100 is able to position the bearing pads 18 for optimal load capacity in either direction of journal rotation by establishing the appropriate asymmetric relationship of each projection 114 and bearing pad 18 with respect to circumferentially consecutive ones of the other element.

A bidirectional journal bearing 200 according to the present invention is illustrated in FIG. 3. The journal bearing 200 supports a bidirectional rotating journal 50 which has an axis of rotation 52. Due to variations in loading, as well as the improbability of achieving a perfectly balanced rotating mass, the position of the axis 52 shifts laterally as indicated at 52' (exaggerated for the purposes of illustration). An object of the journal bearing 200 is to provide uniform support for the journal 50, regardless of its direction of rotation, as its axis 52 is shifted 52'.

The journal bearing 200 comprises a bearing shell 12 circumscribing the journal 50. The bearing shell 12 is held stationary within a housing or support (not shown). A plurality of projections 214 (three are illustrated) are fixed with respect to the bearing shell 12 and extend radially inward toward the journal 50. The projections 214 are equally spaced around the circumference of the bearing shell 12.

A resilient mounting 16 also circumscribes the journal 50 and is radially interposed between the bearing shell 12 and the journal 50. According to the bidirectional journal bearing 200 of the present invention, support for the resilient mounting 16 with respect to the projections 214 is by a plurality of juts 220 received in a respective slot 222,222' (three slots are illustrated, one for each jut 220). One of the plurality of juts 220 is fixed with respect to each of the projections 214 and extends radially inward toward the journal 50. The portions of the slots on either circumferential side of each jut 220 are indicated as 222 and 222'.

A plurality of bearing pads 18 (three are illustrated) are fixed with respect to the resilient mounting 16 and extend radially inward toward the journal 50. The bearing pads 18 are equally spaced around the circumference of the resilient mounting 16.

As shown, there are an equal number of projections 214 and bearing pads 18. Each projection 214 and bearing pad 18 is circumferentially interposed between consecutive ones of the other element in an alternating fashion. That is to say, each projection 214 is circumferentially interposed between consecutive ones of the bearing pads 18, and each bearing pad 18 is circumferentially interposed between consecutive ones of the projections 214.

In operation, rotation of the journal 50 in either direction within the bidirectional journal bearing 200 is accompanied by lateral shifting of the axis 52. Counter-clockwise rotation of the journal 50 causes the bearing pads 18 and resilient mounting 16 to shift counter-clockwise until the juts 220 contact a first side of the slots (i.e. the slot portions 222' are closed; as illustrated in FIG. 3). Clockwise rotation of the journal 50 causes the bearing pads and resilient mounting 16 to shift clockwise until the juts 220 contact the second side of the slots (i.e. the slot portions 222 are closed; not shown). In each case, the circumferential distance from the leading edge (with respect to the direction of rotation of the journal 50) of each bearing pad 18 to the projection 214 proximate to the leading edge is greater than the circumferential distance from the trailing edge (again, with respect to the direction of rotation of the journal 50) of the same bearing pad 18 to the projection 214 proximate to the trailing edge. Inasmuch as the resilient mounting 16 has a relatively small radial thickness, deflection in the radial direction is limited only by the plurality of projections 214. The leading edge of a bearing pad 18 (against which the lateral shifting is directed) deflects radially (by virtue of its attachment to the resilient mounting 16) a greater amount than the trailing edge. This changes the profile of the hydrodynamic pressure wedge between the bearing pad 18 and the journal 50, which facilitates an increased load carrying ability by the bearing pad 18.

The bidirectional journal bearing 200 is able to position the bearing pads 18 for optimal load capacity in either direction of journal rotation by establishing the appropriate asymmetric relationship of each projection 214 and bearing pad 18 with respect to circumferentially consecutive ones of the other element.

What is claimed is:

1. A resilient mount pad type journal bearing for supporting a rotating journal, said bearing comprising:

a bearing shell circumscribing the journal;

a plurality of projections fixed with respect to said bearing shell and extending from said bearing shell radially inward toward the journal, said projections are equally spaced circumferentially around said bearing shell;

a resilient mounting circumscribing the journal and radially interposed between the journal and said bearing shell;

a plurality of bearing pads fixed with respect to said resilient mounting and extending from said resilient mounting radially inward toward the journal, said bearing pads are equally spaced circumferentially around said resilient mounting; and, support means for relating said plurality of projections to said resilient mounting, said support means are circumferentially located between circumferentially consecutive ones of said plurality of bearing pads.

2. The resilient mount pad type journal bearing as described in claim 1, further comprising:

an equal number of said projections and said bearing pads.

3. The resilient mount pad type journal bearing as described in claim 1, wherein each one of said plurality of projections is asymmetrically spaced between each of said circumferentially consecutive ones of said plurality of bearing pads.

4. The resilient mount pad type journal bearing as described in claim 3, wherein said support means include rigid connections between said plurality of projections and said resilient mounting.

5. The resilient mount pad type journal bearing as described in claim 1, wherein said support means include a plurality of stop pairs extending from said resilient mounting, each stop of said plurality of stop pairs extends radially outward toward said bearing shell, each one of said plurality of projections is circumferentially interposed between said stops of a respective said pair of said plurality of stops.

6. The resilient mount pad type journal bearing as described in claim 5, wherein said support means include a plurality of gaps, one of said plurality of gaps is positioned on each circumferential side of each one of said plurality of projections between said stops of each said respective pair of said plurality of stops.

7. The resilient mount pad type journal bearing as described in claim 1, wherein said support means include a plurality of juts, each of said plurality of juts is cooperatively received in a respective one of a plurality of slots.

8. The resilient mount pad type journal bearing as described as described in claim 7, wherein one of said plurality of juts extends from each of said plurality of projections radially inward toward the journal, and said plurality of slots extend circumferentially in said resilient mounting, and one of said plurality of slots is circumferentially interposed between each of said circumferentially consecutive ones of said plurality of bearing pads.

\* \* \* \* \*